(12) United States Patent
Harkema

(10) Patent No.: US 11,474,290 B2
(45) Date of Patent: Oct. 18, 2022

(54) SEGMENTED LIGHT GUIDE HAVING LIGHT-BLOCKING GROOVE BETWEEN SEGMENTS, AND A METHOD OF MANUFACTURING

(71) Applicant: Nederlandse Organisatie voor toegepast-natuurwetenschappelijk onderzoek TNO, 's-Gravenhage (NL)

(72) Inventor: Stephan Harkema, Hilversum (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/275,523

(22) PCT Filed: Sep. 17, 2019

(86) PCT No.: PCT/NL2019/050607
§ 371 (c)(1),
(2) Date: Mar. 11, 2021

(87) PCT Pub. No.: WO2020/060396
PCT Pub. Date: Mar. 26, 2020

(65) Prior Publication Data
US 2021/0286120 A1  Sep. 16, 2021

(30) Foreign Application Priority Data
Sep. 20, 2018  (EP) ..................................... 18195779

(51) Int. Cl.
*G02B 6/10* (2006.01)
*F21V 8/00* (2006.01)

(52) U.S. Cl.
CPC ......... *G02B 6/0021* (2013.01); *G02B 6/0055* (2013.01); *G02B 6/0065* (2013.01)

(58) Field of Classification Search
CPC .... G02B 6/0078; G02B 6/0016; G02B 6/002; G02B 6/0073; G02B 6/0021
See application file for complete search history.

(56) References Cited

U.S. PATENT DOCUMENTS 7,406,245 B2 * 7/2008 Page ...................... G02B 6/002
385/146
7,505,024 B2 * 3/2009 Yoo ..................... G02B 6/0055
345/102

(Continued)

FOREIGN PATENT DOCUMENTS

WO  01/11422 A1  2/2001

OTHER PUBLICATIONS

European Patent Office, International Search Report in corresponding International Application No. PCT/NL2019/050607, dated Feb. 4, 2020 (3 pages).

(Continued)

*Primary Examiner* — Ismael Negron
(74) *Attorney, Agent, or Firm* — Leydig, Voit & Mayer, Ltd.

(57) ABSTRACT

A light guide is described that includes a thermoplastic light channeling layer having at least a first segment, at least a second segment, and at least one groove dividing the thermoplastic light channeling layer into the first segment and second segment. The light guide further includes one or more light sources at least at the first segment. The at least one groove is shaped to block light from leaking between the first segment and the second segment. A method of forming the light guide is described that includes: providing a thermoplastic light channeling layer, thermoforming the at least one groove to divide the light guide into the first and second segments, and providing one of more light sources to at least the first segment.

19 Claims, 11 Drawing Sheets

(56) References Cited

U.S. PATENT DOCUMENTS

| | | | | |
|---|---|---|---|---|
| 7,764,334 | B2* | 7/2010 | Kitagawa | G02B 6/0078 349/65 |
| 7,794,130 | B2* | 9/2010 | Chung | G02B 6/0035 362/612 |
| 7,988,310 | B2* | 8/2011 | Yamada | G02B 6/0043 362/23.16 |
| 8,368,637 | B2* | 2/2013 | Choi | G02B 6/0078 345/102 |
| 8,894,265 | B2* | 11/2014 | Chang | G02B 6/0068 362/616 |
| 9,360,701 | B2* | 6/2016 | Momose | G02B 6/0078 |
| 10,175,414 | B2* | 1/2019 | Shi | G02B 6/0078 |
| 10,620,360 | B2* | 4/2020 | Parikka | G02B 6/0078 |
| 2006/0139905 | A1 | 6/2006 | Kao et al. | |
| 2009/0129049 | A1 | 5/2009 | Lee et al. | |
| 2009/0154193 | A1 | 6/2009 | Yamada et al. | |
| 2009/0310355 | A1 | 12/2009 | Chung et al. | |
| 2010/0020567 | A1 | 1/2010 | Tatehata et al. | |
| 2010/0328362 | A1* | 12/2010 | Song | G02B 6/0038 345/690 |
| 2011/0227895 | A1* | 9/2011 | Takahashi | G02B 6/0078 345/211 |
| 2012/0147584 | A1 | 6/2012 | Wu et al. | |
| 2012/0300135 | A1* | 11/2012 | Cho | G02B 6/0068 348/739 |

OTHER PUBLICATIONS

Masud K Khan, "Flammability Properties of Virgin and Recycled Polycarbonate (PC) and Acrylonitrile-Butadiene-Styrene (ABS) Recovered from End-of-Life Electronics," Journal of Polymers and the Neviroment, Kluwer Academic Publishers-Plenum Publishers, vol. 15, No. 3, pp. 188-194 (2007) XP019553738.

Anonymous, "MP, Tg, and Structure of Common Polymers," Retrieved from the Internet (2019) XP055567965.

* cited by examiner

SEGMENTED LIGHT GUIDE HAVING LIGHT-BLOCKING GROOVE BETWEEN SEGMENTS, AND A METHOD OF MANUFACTURING

CROSS-REFERENCE TO RELATED APPLICATIONS

This patent application is a U.S. National Phase of PCT International Application No. PCT/NL2019/050607, filed Sep. 17, 2019, which claims priority to European Application No. 18195779.6, filed Sep. 20, 2018, which are both expressly incorporated by reference in their entireties, including any references contained therein.

FIELD OF THE INVENTION

The invention relates to a method for obtaining a segmented light guide. The invention further relates to a segmented light guide.

BACKGROUND TO THE INVENTION

Typically light guides are used in indicator panels, control panels, electronic devices, etc. for providing illuminating regions on a surface thereof. The light guide includes a sheet of a substantially transparent material, with one or more light sources illuminating the sheet. Generated light can be guided along the transparent light guide for illuminating one or more regions on the surface.

Segmented light guides are used for independently illuminating regions on the surface. Partially transparent graphics or icons may be placed above so that the icons are illuminated by the segmented light guide underneath. In devices having multiple regions to be independently illuminated, each region is typically illuminated by a separate light guide segment.

Multiple icons may be arranged next to each other on a graphical layer. Many types of icons are possible. The icons may for instance provide an indication or information to a user. For example, an icon may be a button icon, alarm icon, dashboard icon, an airbag symbol, a direction indicator arrow, engine icon, etc. It is undesirable if one icon lights up that the other is also visible (e.g. partially lighting up).

A known solution for independently illuminating multiple regions on a surface is the use of a light guide with a plurality of slits cut therein. The plurality of slits are typically cut by a sharp tool, such as a knife. A slit may physically divide one region of the light guide from the next. In this way, separated light segments can be obtained. After cutting, slits can leak light through reflection and/or refraction and may require optical sealing. Providing the optical sealing typically involves an additional separate step which requires applying a dense ink layer which covers the three-dimensional topography conformably. This can be challenging and costly.

There is a need for an improved manufacturing process for light guides with multiple regions. Furthermore, there is a need for a manufacturing process with a higher degree of design flexibility. Additionally or alternatively, there is a desire to obtain a more cost-effective production of multi-portioned light guides.

SUMMARY OF THE INVENTION

It is an object of the invention to provide for a method and a system that obviates at least one of the above mentioned drawbacks.

Additionally or alternatively, it is an object of the invention to improve flexibility in manufacturing a segmented light guide.

Additionally or alternatively, it is an object of the invention to simplify manufacturing of custom-made segmented light guide designs.

Thereto, the invention provides for a method for obtaining a segmented light guide, including the steps of: providing a thermoplastic light channeling layer; thermoforming at least one groove in the thermoplastic light channeling layer, the at least one groove dividing at least a first segment of the thermoplastic light channeling layer from at least a second segment of the thermoplastic light channeling layer; and providing one or more light sources at at least the first segment;

wherein the at least one groove is shaped such as to block light going from the first segment to the second segment through said groove, or vice versa.

The thermoplastic light channeling layer enables the use of thermoforming which enables significant benefits in manufacturing flexibility. Not only can the thermoplastic light channeling layer have complex 3D shapes (e.g. thermoformed), but also the at least one thermoformed groove can provide an easy way to provide the plurality of segments of the light guide. The temperature of the thermoplastic light channeling layer can be increased to a pliable forming temperature for thermoforming the at least one groove.

Materials suitable for high temperature and/or high pressure lamination and forming processes may be used as the thermoplastic light channeling layer.

Different molding shapes can be used for imprinting the groove on the thermoplastic light channel layer. The groove can be dimensioned and shaped such as to impede light from propagating past the groove from one segment to the next segment of the light guide. In this way, a plurality of optically divided segments in the thermoplastic light channeling layer can be obtained.

The manufacturing process for the segmented light guide can be vastly simplified. Manufacturing custom-made segmented light guide designs, for instance including complex segments and distribution of light sources, can be made easier. The segments can easily be defined by thermoforming one or more grooves on one or more sides of the thermoplastic light channeling layer. The grooves can be imprinted on one side or on both sides of the thermoplastic light channeling layer. For example, it is also possible to use a staggered configuration of grooves, enhancing the capabilities for preventing light going from the first segment to the second segment through said groove, or vice versa.

The groove may form a structure (indentation) which is shaped to substantially prevent light from scattering from one segment to an adjacent segment, and thus an adjacent icon if the adjacent segment is used for illuminating a different icon. During thermoforming, a portion of the surface can be pushed in, in order to obtain an indentation over a certain length along the surface of the thermoplastic light channeling layer. The groove can divide at least a portion of the first segment with respect to a portion of the second segment. The groove may form a loop or closed path such that a closed segment is obtained. However, non-closed or discontinuous grooves may also be used for defining a plurality of segments.

A preformed mold may be used for performing the thermoforming. The preformed mold may have a shape enabling thermoforming the one or more grooves in the thermoplastic light channeling layer. The one or grooves may form light blocking structures between the different segments. Advantageously, the preformed mold may be configured to support the integrity during molding (thermoforming).

Optionally, the thermoplastic light channeling layer remains a unitary layer after thermoforming the at least one groove for obtaining segmentation. Hence, the thermoplastic light channeling layer can remain a continuous layer.

The first segment and the second segment may border to one another along the at least one groove. It will be appreciated that a larger number of segments can easily be created using the thermoforming step. This can be performed simultaneously. The groove may form a slit optically dividing a first segment from a second segment, such that light generated at the first segment is prevented to enter the second segment, and vice versa, through the groove. Such a groove may be accurately thermoformed in the thermoplastic light channeling layer. As a result of the groove, an outer surface of the thermoplastic light channeling layer at the groove may be projected upwards towards an opposite outer surface of the thermoplastic light channeling layer, for dividing segments of the light channel layer from each other in order to obtain a plurality of segments (i.e. segmented regions). Complex segmentations can be achieved using the thermoforming step.

Optionally, the at least one groove is thermoformed in such a way that an upstanding wall is formed between the first segment and the second segment. This upstanding wall is formed by a deformed outer surface of the thermoplastic light channeling layer. Light is substantially prevented from going from the first segment to the second segment and vice versa.

Optionally, optically dense ink layers are applied onto the formed layers prior to thermoforming the grooves. Advantageously, stretchable and/or thermoformable ink layers are applied.

Optionally, the thermoformed thermoplastic light channeling layer is a continuous layer (i.e. without discontinuous removed portions).

Optionally, at least two grooves are disposed parallel to each other along at least a portion of a boundary between the first segment and the second segment. In this way, light may be better blocked by means of the parallel grooves.

The method may further include a lamination step wherein electronic components, such as light sources (e.g. LEDs) and other components are imprinted in the thermoplastic light channeling layer (e.g. TPU). By means of lamination, formation of gas bubbles during thermoforming may be reduced and/or prevented. A mat may be used as a laminator, such that air is pressed out during thermoforming. The mat may for example be a rubber mat. It will be appreciated that other suitable materials may also be used.

Optionally, the thermoplastic light channeling layer is attached to a further light channeling layer having different material properties than the thermoplastic light channeling layer, wherein the thermoplastic light channeling layer has a first glass transition temperature and the further light channeling layer has a second glass transition temperature, wherein the first glass transition temperature is lower than the second glass transition temperature.

The thermoplastic light channeling layer may be configured to allow proper deformation/shaping under thermoforming conditions so that light blocking walls can be formed. The thermoforming process may be carried out in a time frame of a few seconds at a temperature that is suitable for the further light guide layer, but which does not make the further light guide layer too fluid. If this is the case, then the further light guide layer can dent, which can be visually noticeable and lead to rejection of the total product.

Optionally, the first glass transition temperature is at least 10 degrees Celsius below the second glass transition temperature. In an example, the first glass transition temperature is 10-20 degrees Celsius below the second glass transition temperature.

Optionally, the further light channeling layer is thermoformed such as to provide a desired shape. The segmentation of the thermoplastic light channeling layer may be performed during thermoforming of the entire device light guide, i.e. including the shaping of at least the further light channeling layer by means thermoforming under elevated temperatures. In this way, it is possible to create a structure on multiple length scales, i.e. a macroscopic three-dimensional shape for the whole light guide or device, the smaller scale grooves, and optionally microscopic structures to reflect light more diffusely within the light guide.

Optionally, the thermoplastic light channeling layer is more mobile than the further light guide layer during thermoforming.

Optionally, the further light channeling layer is configured to remain thermally unmoldable at a pliable forming temperature at which the thermoplastic light channeling layer is thermoformed. Thus, given a pliable forming temperature of the thermoplastic light channeling layer at which this layer can be thermoformed, in these embodiments the further light channeling layer is of a material being not moldable at said same pliable forming temperature of the thermoplastic light channeling layer. The thermoplastic light channeling layer may be imprinted or thermoformed on the further light channeling layer. Under the conditions for thermoforming the thermoplastic light channeling layer, the thermoplastic light channeling layer can be shaped (e.g. using a mould), while the shape/form of the further light channeling layer can remain the same.

A multilayer arrangement is obtained by connecting the thermoplastic light channeling layer with the further light channeling layer. It is envisaged that one or more additional further light channeling layers can be provided if desired. In an example, the thermoplastic light channeling layer is provided on a particular region of the further light channeling layer, before the at least one groove is imprinted on the thermoplastic light channeling layer.

Optionally, the further light channeling layer is configured to provide a mechanical stability to the thermoplastic light channeling layer. The further light channeling layer may be mechanically stiffer than the thermoplastic light channeling layer for this purpose. The further light channeling layer may thus prevent that the thermoformed thermoplastic light channeling layer would deform (e.g. bend) due to a lack of mechanical stability of the segmented light guide. In an example, the thermoplastic light channeling layer is connected to the further light channeling layer prior to thermoforming the at least one groove on the thermoplastic light channeling layer. The further light channeling layer can be configured to provide the required mechanical stability for imprinting the at least one groove on the thermoplastic light channeling layer during thermoforming.

Optionally, first the further light channeling layer is provided wherein consecutively the thermoplastic light channeling layer is attached thereto. Then by means of thermoforming a plurality of segments can be created in the thermoplastic light channeling layer, while stability is mainly provided by the further light channeling layer. The further light channeling layer may be made out of a different material providing stronger mechanical properties (e.g. improved stiffness).

The thermoplastic light channeling layer and the further light channeling layer may be manufactured separately and attached to each other. The layers can be combined together under elevated temperature at which the thermoplastic light channeling layer becomes sticky. A sticky layer, e.g. thin glue layer, a TPU layer, or a similar layer, may be optionally added in order to facilitate adhesion.

The thermoplastic light channeling layer may be attached to the further light channeling layer over its entire surface or a part of its surface. In an example, the thermoplastic light channeling layer may be provided locally at regions where segments are to be provided on the further light channeling layer.

The further light channeling layer may be made out of polymethyl methacrylate (PMMA), acrylonitrile butadiene styrene (ABS), polycarbonate (PC). These materials may be chosen such that the thermoplastic light channeling layer can be thermoformed without causing deformation in the further light channeling layer during said thermoforming.

The segmented thermoplastic light channeling layer can be installed locally on a separate structure such as the further light channeling layer. Advantageously, the one or more light sources (e.g. arranged on the substrate layer) can be embedded locally into the thermoplastic light channeling layer. Therefore, also the one or more light sources can be arranged locally. The thermoplastic light channeling layer (e.g. made out of TPU) can form a hotmelt in which a light source (e.g. LED) is embedded therein during a lamination process. This can for instance be achieved by imprinting or pushing the light source in the thermoplastic light channeling layer during the lamination process. Optionally, embedding of the one or more light sources in the thermoplastic light channeling layer is not performed during thermoforming, but rather during a separate laminating step.

The further light channeling layer can have two additional layers attached thereto. The top layer can be a graphical layer with a smaller opening for illuminating an icon. The bottom layer can be a reflecting layer with a larger opening. Light generated at a segment of the thermoplastic light channeling layer can enter the further light channeling layer through the larger opening. This light can illuminate the icon through the smaller opening which is arranged opposite the larger opening.

The further light channeling layer may have a (non-planar) three-dimensional shape. Optionally, the thermoplastic light channeling layer is provided on the further light channeling layer including the one or more light sources (e.g. LEDs), e.g. integrated on the further light channeling layer.

The thermoplastic light channeling layer may have material properties allowing thermoforming at temperatures higher than 90 degrees Celsius. In an example, thermoforming is possible at temperatures in a range of 90-180 degrees Celsius. For example, thermoforming may be made possible in a range of 150-160 degrees Celsius for PC.

Optionally, the thermoplastic light channeling layer is made out of a material which is softer than a material of the further light channeling layer. Optionally, the thermoplastic light channeling layer is made out of at least one of: thermoplastic polyurethane (TPU), polyvinyl butyral (PVB), poly(methyl methacrylate) (PMMA). Other thermoplastic materials can also be employed as the thermoplastic light channeling layer.

TPU is an elastomer (polymer) having advantageous properties for use as the light channeling layer. TPU allows accurate thermoforming while useful (transparent) as a channel for light. TPU is a linear segmented block copolymer composed of hard and soft segments. The hard segment can be either aromatic or aliphatic. The soft segment can either be a polyether or polyester type, depending on the application. For even greater utility, i.a. the molecular weight, ratio and chemical type of the hard and soft segments can be varied. In this way, the material properties of a TPU light channeling layer may be tweaked for enabling thermoforming at a pliable forming temperature different (smaller) than a damage and/or pliable forming temperature for at least the further light channeling layer. It will be appreciated that other elastomers than TPU can also be employed.

The thermoplastic light channeling layer may for instance be made of Crystalflex®, Plastimo®, Benis®, Platilon®, Framis. Other suitable transparent and/or hazy TPU light channeling materials may also be used.

Optionally, the material of the further light channeling layer is also made out of a thermoplastic material, such as TPU or a material of the same class as the material of the thermoplastic light channeling layer. Advantageously, the further light channeling layer has different material properties with respect to the thermoplastic light channeling layer, wherein further light channeling layer is configured to behave differently in the temperature domain compared to the thermoplastic light channeling layer.

Optionally, the one or more light sources are arranged at at least the first segment by means of an imprinting step. In an example, the imprinting of the one or more light sources is performed under elevated pliable forming temperature (also thermoforming). By means of thermoforming the at least one groove, one or more light sources (e.g. light emitting diodes) can be positioned at one or more segments in an accurate way. It will be appreciated that other methods may also be employed for providing the one or more light sources at at least the first segment. For instance, the one or more light sources may be provided by mechanically deforming the thermoplastic light channeling layer or locally removing material in order to obtain an indentation substantially conforming to at least a portion of the shape of the one or more light sources.

Optionally, the at least one groove is thermoformed on at least one side of the thermoplastic light channeling layer by means of hot pressing. However, other suitable methods may also be employed.

Optionally, a light reflecting layer is applied on at least a portion of an upper side and/or a lower side of the light channeling layer, wherein a first light reflecting layer is arranged between the thermoplastic light channeling layer and the further light channeling layer, wherein at least one opening is arranged in the first light reflecting layer located at least at the first segment, wherein the at least one opening is configured such as to allow light generated by the one or more light sources in the first segment of the thermoplastic light channeling layer to enter the further light channeling layer.

The light reflecting layers may be configured to reflect at least a portion of the light that falls on it, generated by the one or more light sources. The groove may be configured to form different segmented rooms surrounded by the light reflecting layer(s), wherein generated light can escape the room through the opening such as to illuminate a portion of the further light channeling layer. A to be illuminated icon or graphic can be arranged on a side opposite the interface side with the thermoplastic light channeling layer.

Optionally, the reflecting layer is a white layer. Other types of reflecting layers may also be employed (e.g. different color).

Optionally, a second light reflecting layer is arranged at least at a portion of the groove. For example, light generated by the one or more light sources in the first segment of the thermoplastic light channeling layer can be at least partially reflected back towards the interior of the first segment when encountering the groove. In this way, the groove can better prevent/block light from going from the first segment to the adjacent second segment of the thermoplastic light channeling layer.

Optionally, the second light reflecting layer is arranged at a bottom side of the thermoplastic light channeling layer. Also this layer can be a white layer in an example.

Optionally, at least one light reflecting layer is made out of a stretchable and/or thermoformable ink layer. The at least one light reflecting layer may be applied or attached to the thermoplastic light channeling layer prior to performing a thermoforming step. Thermoforming can result in a local or general warping of the surface of the thermoplastic light channeling layer on which the at least one light reflecting layer is applied or attached. Therefore, during thermoforming the thermoplastic light channeling layer, the light reflecting layer can conform to the thermoformed shape due to the stretching properties. An example of a stretchable and/or thermofordable ink layer is DuPont ME603.

Optionally, all light reflecting layers are made out of a stretchable and/or thermoformable ink layer.

The reflective layer may be a non-transparent layer, which is better for the total efficiency. It may also be possible to utilize a semitransparent reflective layer for one or more reflective layers.

Optionally, the reflective layer is a diffusive reflective layer. Light escaping the light channeling compartment of a segment can look more diffuse in this way such that a more uniform light distribution can be obtained.

Optionally, the stretchable and/or thermoformable ink layer is applied on the thermoplastic light channeling layer prior to thermoforming the at least one groove, the stretchable and/or thermoformable ink layer following the shape of the groove.

Furthermore, the thermoplastic light channeling layer may be thermoformed to have a general shape (e.g. curved) depending on the application. Also in this situation the light reflecting layer can follow the curved deformed shape of the thermoplastic light channeling layer. Optionally, the one or more light sources can be positioned at at least the first segment after the light reflecting layer is applied. A pre-applied light reflecting layer can also be beneficial if the one or more light sources are applied using a thermoforming step.

Optionally, the one or more light sources are arranged on a substrate layer which is attached to the thermoplastic light channeling layer.

The substrate layer may include electronic components for the one or more light sources. For instance, the electronic components may be printed on a substrate. Other manufacturing processes may also be used such as for example lithography, 3D printing, Laser Induced Forward Transfer (LIFT), etc. The electronic components may be arranged in an encapsulating substrate layer configured to at least partially encapsulate the one or more electronic components and/or the one or more light sources. Optionally, the substrate layer is also is stretchable and/or thermoformable. In this way, advantageously, also the substrate layer can be pre-applied prior to thermoforming the thermoplastic light channeling layer.

The substrate layer (which may include a circuit, electronic components, one or more light sources such as LEDs) may be first attached to the thermoplastic light channeling layer prior to performing the thermoforming step. In the thermoforming step, the at least one groove is made such that light is blocked within a chosen segment. In this way, icons may be illuminated more accurately.

Optionally, the substrate layer is also a reflecting layer. The substrate layer may include a thinner substrate (e.g. polyethylene terephthalate PET, polyethylene naphthalate PEN, etc.) with a reflector (e.g. white surface), circuits, one or more light sources, electronic components and glue. The thermoplastic light channeling layer may be applied thereto.

Optionally, the further light channeling layer includes a graphical layer. The graphical layer can include a graphical print.

The graphical layer may include to be illuminated icons/graphics. These icons can be positioned such as to be illuminated by light escaping a segment through the opening of the light reflecting layer arranged between the thermoplastic light channeling layer and the further light channeling layer. If for instance the one or more light sources at the first segment of the thermoplastic light channeling layer are activated, light can escape the first segment through the opening and be directed towards an icon.

The graphical layer can be printed, but can also be attached, for instance using an adhesive (pasting).

Optionally, one or more layers of the thermoplastic light channeling layer may be patterned for increasing diffusion for improving homogeneity.

Outcoupling of light can be obtained or improved by using small structures within the thermoplastic light channeling layer. For instance, microdots, nanodots, half spheres, pyramid like structures, laser lines, etc. may be used.

According to an aspect, the invention relates to a segmented light guide, comprising: a thermoplastic light channeling layer comprising at least one thermoformed groove dividing at least a first segment of the thermoplastic light channeling layer from at least a second segment of the thermoplastic light channeling layer; one or more light sources at at least the first segment; wherein the at least one groove is shaped such as to block light going from the first segment to the second segment through said groove, or vice versa.

A light channeling compartment can be obtained within the thermoplastic light channeling layer at at least the first segment. The light is generated within such a light channeling compartment by means of the one or more light sources. The light channeling compartments can have at least one opening through which light can escape the thermoplastic light channeling layer for passing through a graphic layer for illuminating an icon. Optionally, the walls surrounding the light channeling room are white in order to obtain an improved efficiency. Other types of reflecting surfaces may also be used, such as light colored surfaces, mirror reflecting surfaces, etc. The one or more light sources can be light emitting diodes (LEDs) which are mounted onto the substrate layer. Other types of light sources may also be employed. Furthermore, electronic circuits and other electronic components necessary for the one or more light sources can also be printed on the substrate layer.

By means of the light channeling compartments at at least the first segment, light can be directed to separate icons as desired. In this way, it can be prevented than an icon lights up undesirably when an neighboring icon lights up.

Advantageously, the thermoplastic light channeling layer can be thermoformed enabling easy attachment to the further light channeling layer having a complex shape (e.g. warped, curved, etc.). Furthermore, thermoforming the at least one groove on the thermoplastic light channeling layer enables a simple way for obtaining complex segmentation of the thermoplastic light channeling layer. Furthermore, alignment can be maintained during thermoforming.

Optionally, the thermoplastic light channeling layer is attached to a further light channeling layer having different material properties than the thermoplastic light channeling layer, wherein the thermoplastic light channeling layer has a first glass transition temperature and the further light channeling layer has a second glass transition temperature, wherein the first glass transition temperature is lower than the second glass transition temperature.

Optionally, the further light channeling layer is thermoformed such as to provide a desired shape. The further light guide layer may be made out of a thermoformable material. The further light channeling layer may be thermoformed in order to obtain a three-dimensional desired shape during thermoforming the thermoplastic light channeling layer. It may also be possible that, additionally or alternatively, the further light channeling layer is thermoformed prior to and/or after thermoforming of the thermoplastic light channeling layer. In this way, a desired overall shape of the segmented light guide may be obtained. An overall three-dimensional structure can be obtained wherein the one or more grooves thermoformed in the thermoplastic light channeling layer provide light guide blocking structures for obtaining light segmentation within the light guide. Optionally, smaller features may be introduced in the light guide by means of the mold (e.g. small features for obtaining light diffusion).

By means of three-dimensional thermoforming, a desired three-dimensional structure of the light guide (e.g. including at least the thermoplastic light channeling layer and the further light channeling layer) can be molded, under an elevated temperature and pressure. Various three-dimensional shapes may be employed. Advantageously, all the layers of the light guide being thermoformable are pliable under said elevated temperature and/or pressure during thermoforming. In this way, it can be avoided that a structure or layer of the light guide breaks during thermoforming. The layer of the light guide with the highest glass transition temperature (Tg), for example the further light channeling layer, may therefore also be made pliable. The choice of the thermoplastic light channeling layer and the further light channeling layer may be made such that it is avoided that during thermoforming the thermoplastic light channeling layer becomes too soft/mobile.

Optionally, the further light channeling layer is configured to remain thermally unmoldable at a pliable forming temperature at which the thermoplastic light channeling layer is thermoformed.

The thermoplastic light channeling layer can be a transparent layer configured to channel light therethrough. The further light channeling layer can also be a transparent layer, although having different material properties. In this way, the segmented light guide may have at least two light channeling layers attached with respect to each other.

The further light channeling layer may be a mechanically stronger layer than the thermoplastic light channeling layer. The thermoplastic light channeling layer is thermoformable and the further light channeling layer provides a mechanical base layer which is not thermally moldable at the same temperature as the thermoplastic light channeling layer. Hence, mechanical stability can be provided by the further light channeling layer while imprinting the at least one groove on the thermoplastic light channeling layer.

A reflecting material or layer (e.g. coating) may be deposited on a surface of the thermoplastic light channeling layer at least adjacent to the at least one groove. The reflective layer may be applied on the surface of the thermoplastic light channeling layer and/or the further light channeling layer in different ways, such as for instance deposition, printing, gluing, laminating, etc. Optionally, the reflective layer is substantially opaque.

By using a stretchable and/or thermoformable ink layer as the reflecting layer, it can be prevented that the layer is damaged by thermoforming the at least one groove on the thermoplastic light channeling layer. Alternatively or additionally, injection molding may be applied for at least partially providing a reflecting layer after thermoforming the at least one groove. For instance, the indentations formed by the at least one groove can be filled with injection molding (e.g. 2 k or 3 k injection moulding).

According to a further aspect, the invention relates to an electronic device and/or indicator panel comprising a segmented light guide.

Icons illuminated by light guides based on side emitting LEDs may be inhomogeneous because of high scattering close to the edge of the icon and low brightness at the center of the icon. Furthermore, neighboring icons may suffer from cross-illumination. The method may provide multilayered segmented light guide made of materials with different glass-transition temperatures (Tg) so that thermoforming introduces a groove (i.e. a deformation) with light blocking properties, a larger shape for the application (e.g. 3D shape of a device) and reflective layers (e.g. printed) for internal reflections and light blocking. The segmented light guide may achieve a homogeneous emission for a wide variety of icon shapes without the use of diffusion structures and surface topography, despite the use of side emitting light sources (e.g. LEDs) with a very wide and impractical beam shape. The thermoplastic light channeling layer may also be used for fully embedding LEDs and/or other components therein.

The segmented light guide provides a cheaper solution with a high degree of flexibility in design and formability by thermoforming. Moreover all the layers may be in optical contact, requiring no additional diffusors to achieve a high degree of homogeneity (e.g. 80% or higher).

The multi-sector (segmented) light guide may include two or more light channeling layers with different mechanical properties (e.g. Tg and diffusivity) of which a first light channeling layer (e.g. thermoplastic light channeling layer) may contain a low to moderate degree of haziness, and the interface contains a white reflector with a first opening with a generic geometry (e.g. circular, square, rectangular). The reflectors on both sides of the first light channeling layer, of which one contains said first opening, can be made of a printed white material (e.g. diffusive, glossy, semitransparent, etc.) at the interface between both light guides. The light emission of the light sources not reflected by this white reflector can be negated by a black layer or coating that is printed on top of the second light channeling layer (e.g. further light channeling layer) of the light guide. The creation of light blocking walls in the first light channeling layer during thermoforming and shaping of the entire assembly containing one or more light guide based icons can create optically isolated sectors in the entire light guide. The light blocking walls are not only interruptions of the first light channeling layer of the light guide, but can also involve shaping of the bottom reflector, which may be configured to conformably follow the thermoformed shape. One or more substantially opaque layers on the second light channeling layer of the segmented light guide may be provided with a second opening with an arbitrary and possibly complex shape, and a preferably dark (e.g. black) first layer on the top light guide. The dark layer can effectively prevent wave guiding in the second light channeling layer, effectively suppressing scattering at the edges of the opening on top of the second light channeling layer and negating transmitted light directly from the light sources through the reflecting layer between the first and second light channeling layers.

In an example, it may no longer be required to use separate diffusors or surface textures, which can greatly simplify the manufacturing process and reduce costs. However, if needed, diffusors may be used. Advantageously, the diffusion required to obtain the scattering of light may come from the TPU itself.

A partially segmented light guide can be obtained wherein only the first light channeling layer (i.e. thermoplastic light channeling layer) is segmented. Advantageously, the segmented light guide may provide homogenous outcoupling of light without the usage of patterned layers and diffusors. A light guide including of at least two light channeling layers may be used with different Tg/rigidity of which only one is segmented by means of thermoforming.

Microscopic, e.g. light blocking grooves around the icon/LEDs, and macroscopic shapes, e.g. curvature, are formed (using thermoforming) in the first light channeling layer (cf. thermoplastic) in order to create a desired shape of the whole assembly of the segmented light guide, and apply the light blocking shapes without breaking the reflective and/or conductive layer(s) applied on or attached to the first light channeling layer. In an example, glossy white reflectors can be used as opposed to matt diffuse white or specular metallic mirrors in light guides of which one is partially transmissive. Flat layers can be used and no additional diffusors may be required, while achieving high homogeneity of icons.

A thermoformable substrate layer can be used to print conductive tracks (e.g. silver) thereon. Light sources (e.g. LEDs) can be provided, and a reflective layer can be applied on the substrate layer (e.g. layer with a light color such as white).

The first light channeling layer (e.g. TPU) may be laminated onto the light sources on the substrate layer. A flat surface can be obtained. Advantageously, the TPU is slightly hazy, which may lead to the necessary diffusivity to allow out-coupling. The thickness of the TPU (e.g. Crystalflex®) might be an optimization parameter.

The second/further light channeling layer being in direct contact with the first light channeling layer may improve direct light transmission. The refractive indices may be relatively similar leading to less widening of the beam of light from TPU to PC as opposed to air. If PC is used, the TPU light guide layer can be coupled to PC. In an example, a glossy white semitransparent reflecting layer is applied to PC before lamination, for instance by printing. It may also be use a matt and/or diffusive reflecting layer.

One or more graphically printed layers may be applied onto the PC layer to further define the icon. A dark color (e.g. black) may be used on a side towards the second light channeling layer.

It will be appreciated that any of the aspects, features and options described in view of the method apply equally to the segmented light guide and the described electronic device and/or indicator panel. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
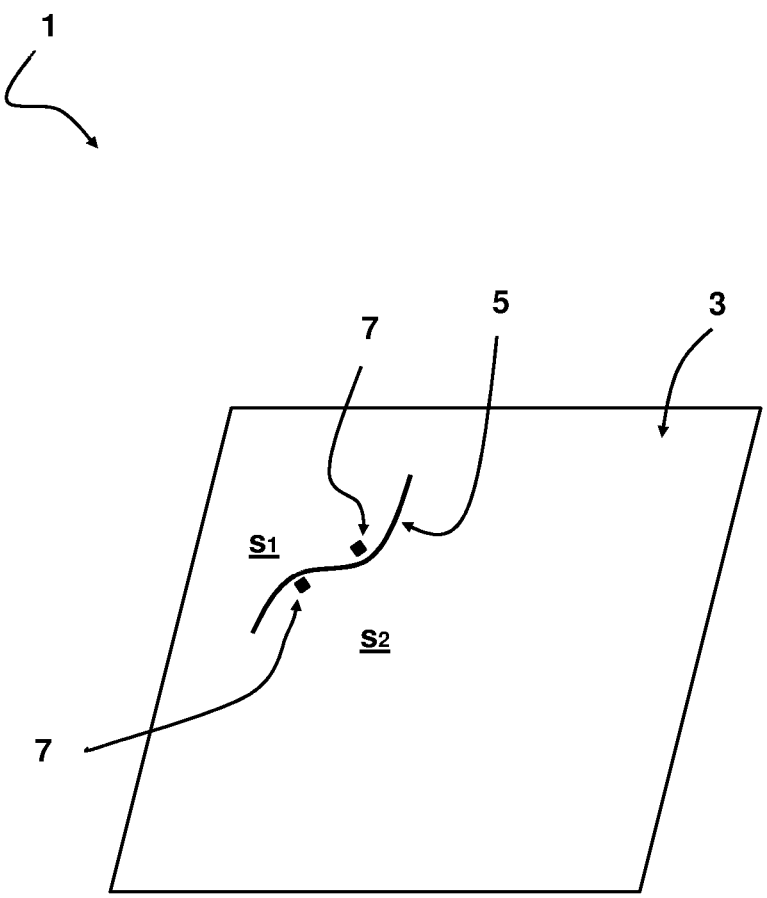
FIG. 1 shows a perspective view of a schematic diagram of a segmented light guide.

FIG. 1 shows a perspective view of a schematic diagram of a segmented light guide 1. The segmented light guide 1 includes a thermoplastic light channeling layer 3. A least one groove 5 is thermoformed in the thermoplastic light channeling layer 3, the at least one groove 5 dividing at least a first segment S1 of the thermoplastic light channeling layer 3 from at least a second segment S2 of the thermoplastic light channeling layer 3. In this example, a light source 7 is provided in the first segment S1 and the second segment S2. The at least one groove 5 is shaped such as to block light going from the first segment S1 to the second segment S2 through said groove, or vice versa.

During the thermoforming step, the thermoplastic light channeling layer 3 may become easily deformable, allowing an easy way to form the at least one groove 5 thereon. Locally, along the at least one groove 5, material can be pushed away. Furthermore, by means of thermoforming the one or more light sources 7 (e.g. LEDS) can be enclosed by the thermoplastic light channeling layer 3. This provides an easy way of embedding the one or more light sources 7 in the thermoplastic light channeling layer 3.

Advantageously, the thermoplastic light channeling layer is configured to be thermally processed, enabling complex segmentation. As a result of the thermoforming step, more manufacturing flexibility and/or an improved manufacturing customization can be obtained for producing the segmented light guide. Additionally, optionally, the one or more light sources can be embedded at least the first segment also using thermoforming.

Figure 2:
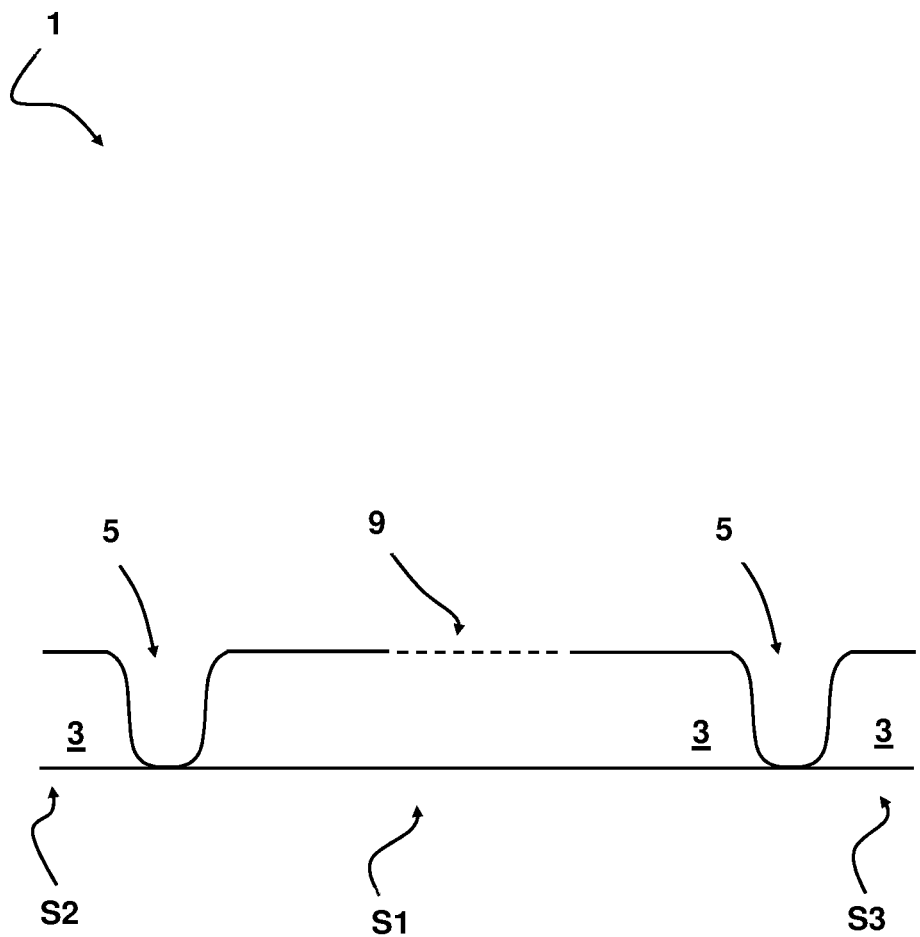
FIG. 2 shows a cross sectional side view of a schematic diagram of a segmented light guide.

FIG. 2 shows a cross sectional side view of a schematic diagram of a segmented light guide 1. A first segment S1 is divided from other segments by means of grooves 5, namely a second segment S2, and a third segment S3 of the thermoplastic light channeling layer 3. The grooves 5 between the segments are configured to prevent light going from one segment to the other segment. One or more light sources 7 (not shown in this figure) can be arranged at at least the first segment S1 of the thermoplastic light channeling layer 3. A transparent opening 9 can be arranged at the first segment S1 for allowing generated light to escape the formed first segment S1 of the thermoplastic light channeling layer 3. The light escaping the first segment S1 through the opening 9 can be used for illuminating an icon. In this example, the at least one groove 5 is thermally imprinted in the thermoplastic light channeling layer 3 by pressing under elevated temperature a structure therein during the thermoforming process.

Figure 3:
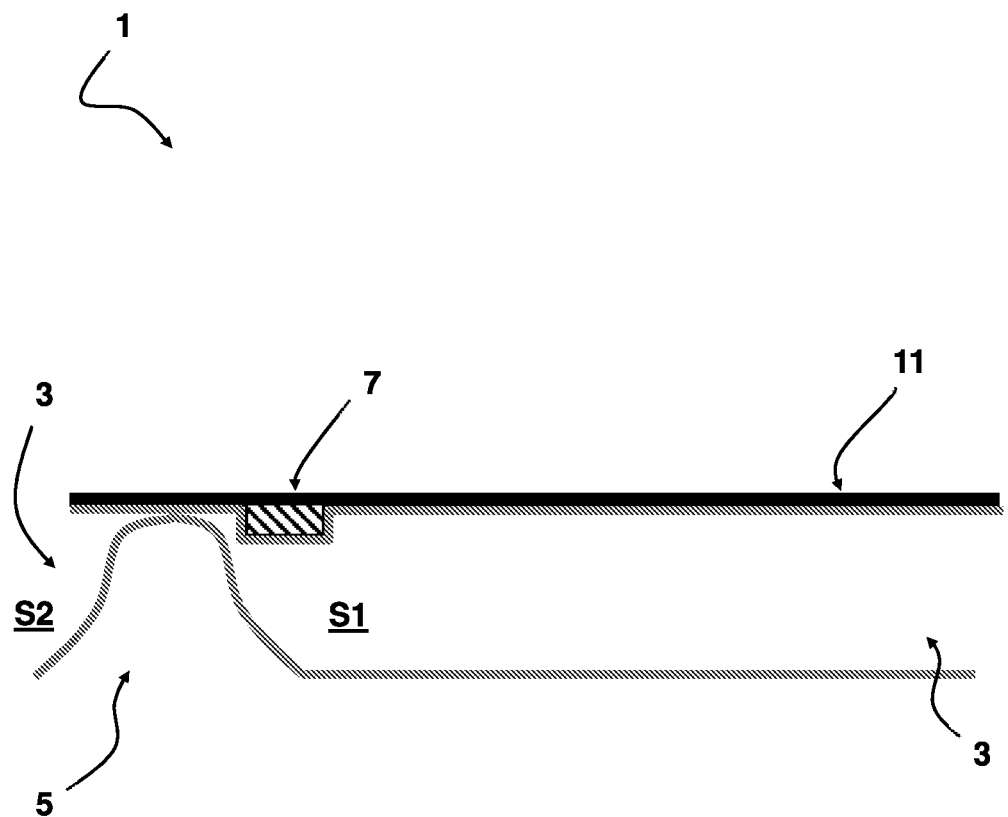
FIG. 3 shows a cross sectional side view of a schematic diagram of a segmented light guide.

FIG. 3 shows a cross sectional side view of a schematic diagram of a segmented light guide 1. A groove 5 is separates a first segment S1 from a second segment S2 of the thermoplastic light channeling layer 3. The lower outer surface of the thermoplastic light channeling layer is thermoformed for obtaining the groove 5. A light source 7 is arranged on a substrate layer 11 which is attached to the thermoplastic light channeling layer 3. The substrate layer 11 is attached to the thermoplastic light channeling layer 3 during a lamination or thermoforming step. In this way, the light source 7 is embedded into a surface of the thermoplastic light channeling layer 3. It will be appreciated that it is also possible that the substrate layer 11 is arranged on the other side of the thermoplastic light channeling layer 3 (lower side in the example). The light source 7 may be a light emitting diode (LED). The substrate layer 11 may include circuits and electronic components necessary for operating the LED. Also processing can occur immediately onto layer 15. Other electronic components may also be arranged on or embedded in the substrate layer.

It will be appreciated that the exemplary embodiment of FIG. 3 is not drawn in scale. The thickness of the LED is typically smaller or closer to the thickness of the light guide. Furthermore, the grooves may have a rounded tip and may have a relatively small height-width ratio.

Figure 4:
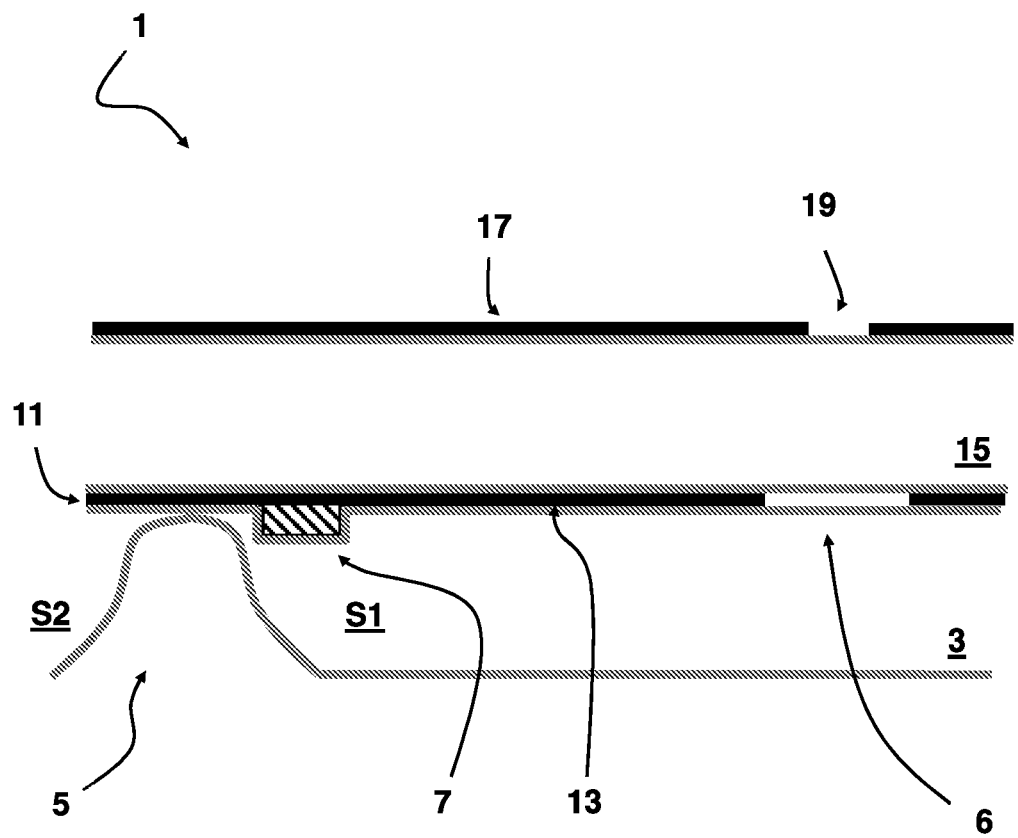
FIG. 4 shows a cross sectional side view of a schematic diagram of a segmented light guide.

FIG. 4 shows a cross sectional side view of a schematic diagram of a segmented light guide 1. Similar to the example as shown in FIG. 3, the segmented light guide 1 includes a thermoplastic light channeling layer 3 with a groove 5 thermoformed therein. In this way, two segments S1, S2 are formed. Furthermore, in this example, a substrate layer 11 including a light source 7 is embedded in the thermoplastic light channeling layer 3. The light source 7 is positioned at the first segment S1. Similarly, optionally, a light source can be positioned at the second segment S2. The substrate layer 11 includes a reflecting layer 13. The light reflecting layer 13 can for instance be printed on the substrate layer 11. However, the substrate layer 11 may also for example be made out of a substantially opaque material, forming a reflecting layer. In the substrate layer 11 and/or the reflecting layer 13, an opening 9 is arranged allowing light generated within the first segment S1 of the thermoplastic light channeling layer 3 to enter a further light channeling layer 15. The thermoplastic light channeling layer 3 has different material properties than the further light channeling layer 15. In this example, the further light channeling layer 15 has a graphic layer 17 with an icon 19 (forming an opening). Advantageously, the icon 19 can have a smaller size than the opening 6 such as to prevent light inhomogeneities at the edges of the of the opening 6.

The reflective layer 13 may be a printed layer. A white material can be used allowing substantial reflection when light impinges on its surface. It is preferred that the reflective layer 13 is sufficiently dense allowing reflection even after being stretched out due to the thermoforming step.

The reflecting layer 13 may be stretchable and/or thermoformable. Advantageously, the thermoplastic light channeling layer 3 and the stretchable and/or thermoformable reflective layer 13 can deform and follow the desired shape applied during the thermoforming step.

The segmented light guide 1 as a whole can become stronger when the thermoplastic light guide 3 is attached to a further mechanically stronger structure, such as for instance the further light channeling layer 15.

At the at least one groove 5, the thermoplastic light channeling layer 3 can become mechanically weak (locally). In order to improve the mechanical stability of the segmented light guide 1, the thermoplastic light channeling layer 3 can be connected to the further light channeling layer 15.

The thermoplastic light channeling layer may for instance be made of TPU and the further light channeling layer 15 may for instance be made of PC. PC has a higher processing temperature (around 144 degrees Celsius) than TPU (around 110 degrees Celsius). TPU can in certain circumstances, together with white ink, sufficiently contribute to diffusion of light so that no additional diffusers are needed. In this way, the segmented light guide can be made easier to manufacture. However, it is also envisaged that one or more diffusers are included if a higher yield is required.

In an exemplary embodiment, the further light channeling layer 15 is configured to be thermoformable. Both the thermoplastic light channeling layer 3 and the further light channeling layer 15 may be thermoformed in order to manufacture the light guide. The further light guide layer 15 may be thermoformed in order to obtain an overall three-dimensional desired shape of the light guide. Thermoforming of the further light channeling layer 15 may be carried out simultaneously with thermoforming of the thermoplastic light channeling layer. It may also be possible that, additionally or alternatively, the further light channeling layer 15 is thermoformed prior to and/or after thermoforming of the thermoplastic light channeling layer 3. An even smaller topology could also be introduced, if necessary, by providing finer structures in the topology of the mold.

Figure 5:
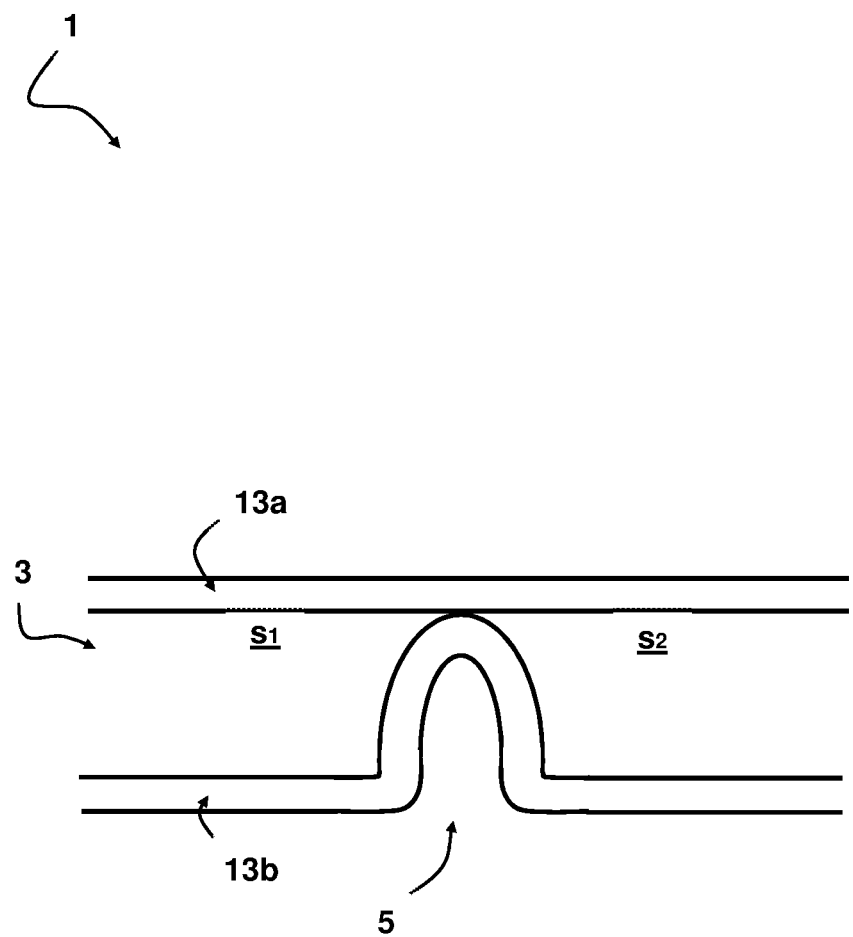
FIG. 5 shows a cross sectional side view of a schematic diagram of a segmented light guide.

FIG. 5 shows a cross sectional side view of a schematic diagram of a segmented light guide 1. A groove 5 is thermoformed in the thermoplastic light channeling layer 3. Two segments S1, S2 are formed in the thermoplastic light channeling layer 3. In this example, a light reflecting layer 13a, 13b is applied on at least a portion of an upper side and a lower side of the thermoplastic light channeling layer. A first light reflecting layer 13a can be arranged on the upper side. This upper side may for instance be an interface between the thermoplastic light channeling layer 3 with an optional further light channeling layer (not shown). Hence, when the thermoplastic light channeling layer 3 is attached to the further light channeling layer, the first light reflecting layer 13a may be arranged between the thermoplastic light channeling layer 3 and the further light channeling layer. At least one opening may be arranged in the first light reflecting layer 13a located at least at the first segment. In this way, light generated in the first segment can escape the first segment of the thermoplastic light channeling layer for illuminating a further surface (e.g. an icon). When the thermoplastic light channeling layer 3 is attached to the further light channeling layer, the at least one opening can be configured such as to allow light generated by the one or more light sources in the first segment of the thermoplastic light channeling layer to enter the further light channeling layer. This light can then further illuminate a graphical layer attached to the further light channeling layer. In this example, a second light reflecting layer 13b is arranged covering the groove 5. In this way, light can be prevented from passing the groove from a first segment S1 to the second segment S2, and/or vice versa.

In an example, the first reflecting layer 13a and/or the second reflecting layer 13b are stretchable and/or thermoformable ink layers, so that during the thermoforming process they can be deformed without being ripped or damaged. The reflecting layer may for example be a white opaque layers. However, other reflecting surfaces can also be employed (e.g. glossy white). Many variants are possible.

The groove may have a rounded tip. A sharp tip may be avoided in some examples.

Figure 6:
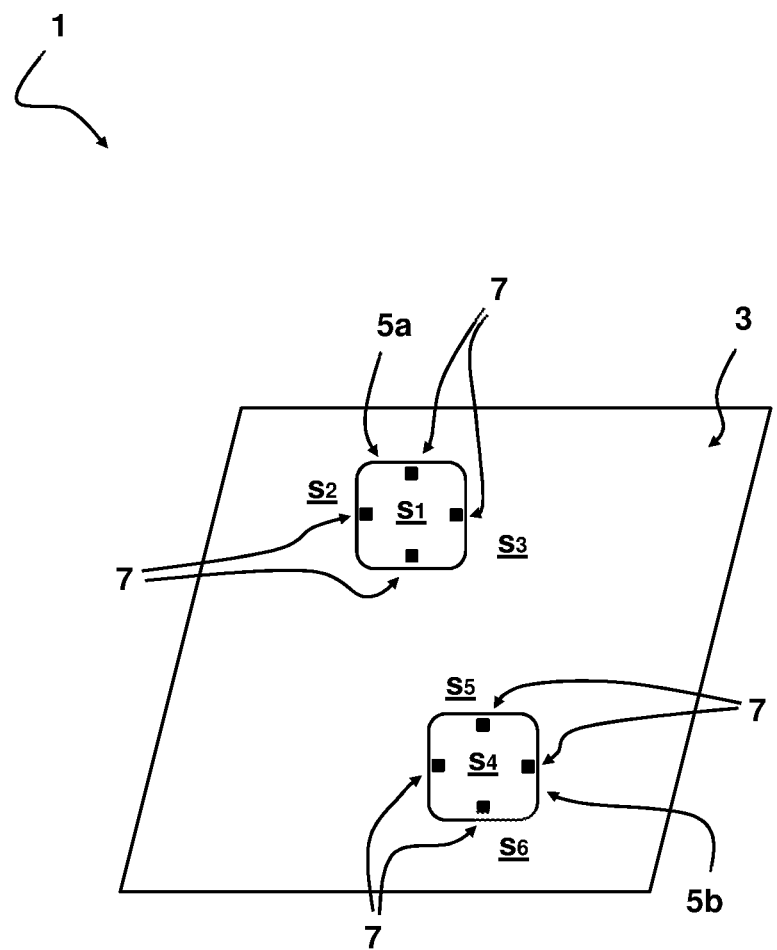
FIG. 6 shows a perspective view of a schematic diagram of a segmented light guide.

FIG. 6 shows a perspective view of a schematic diagram of a segmented light guide 1. A plurality of segments S1, S2, S3, S4, S5, S6 are formed by thermoforming two grooves 5a, 5b into the thermoplastic light channeling layer 3. In this example, the two grooves 5a, 5b have a closed path (forming a loop). Grooves 5a, 5b enclose the segments S1, S4, respectively. Multiple light sources 7 are arranged in the segments S1, S4. In order to reduce inhomogeneity, a plurality of light sources 7 can be arranged at a segment of the thermoplastic light channeling layer 3.

The thermoplastic light channeling layer 3 may be attached to a further light channeling layer 15 (not shown), having different material properties. The further light channeling layer may be mechanically stronger, providing additional stability. Furthermore, the further light channeling layer may be configured to remain unmoldable or hard during thermoforming the thermoplastic light channeling layer.

The further light channeling layer may have a first side with a graphical print layer attached thereto. Additionally or alternatively, the further light channeling layer may have a second side, opposite the first side, with a reflective layer attached thereto.

Figure 7:
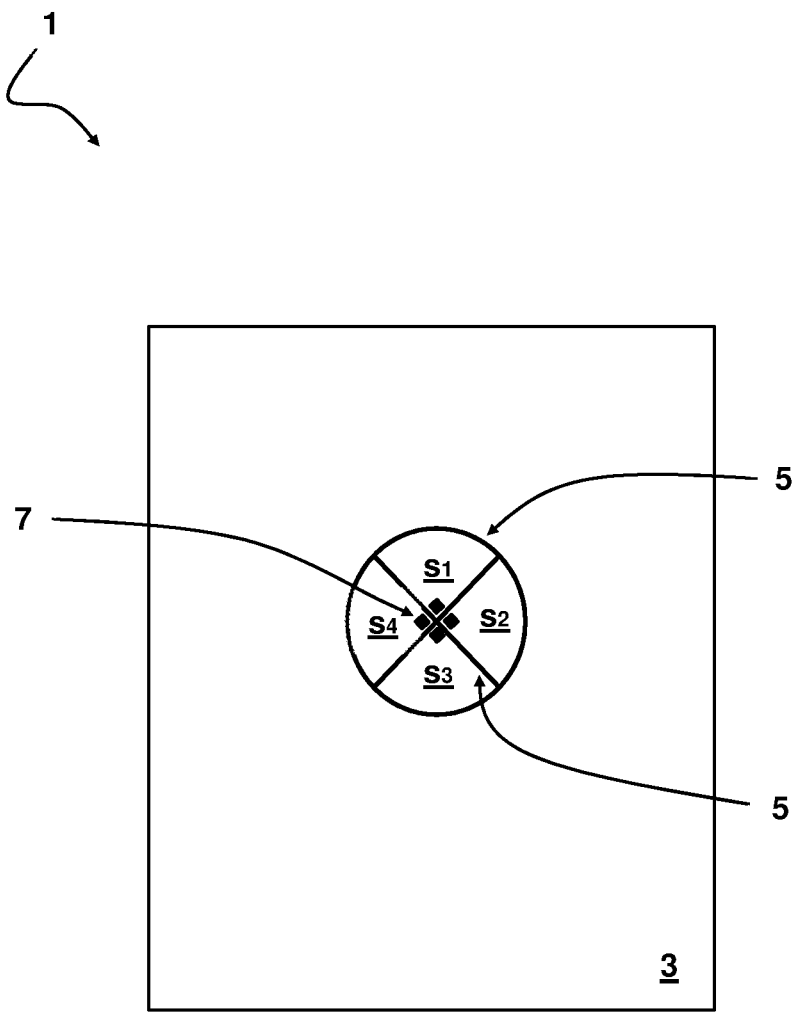
FIG. 7 shows a top view of a schematic diagram of a segmented light guide.

FIG. 7 shows a top view of a schematic diagram of a segmented light guide 1. Four segments S1, S2, S3, S4 are formed in the thermoplastic light channeling layer 3 by means of the thermoformed groove(s) 5. A light source 7 is positioned at each of the segments S1, S2, S3, S4. It will be appreciated that many segmentation patterns are possible.

Figure 8:
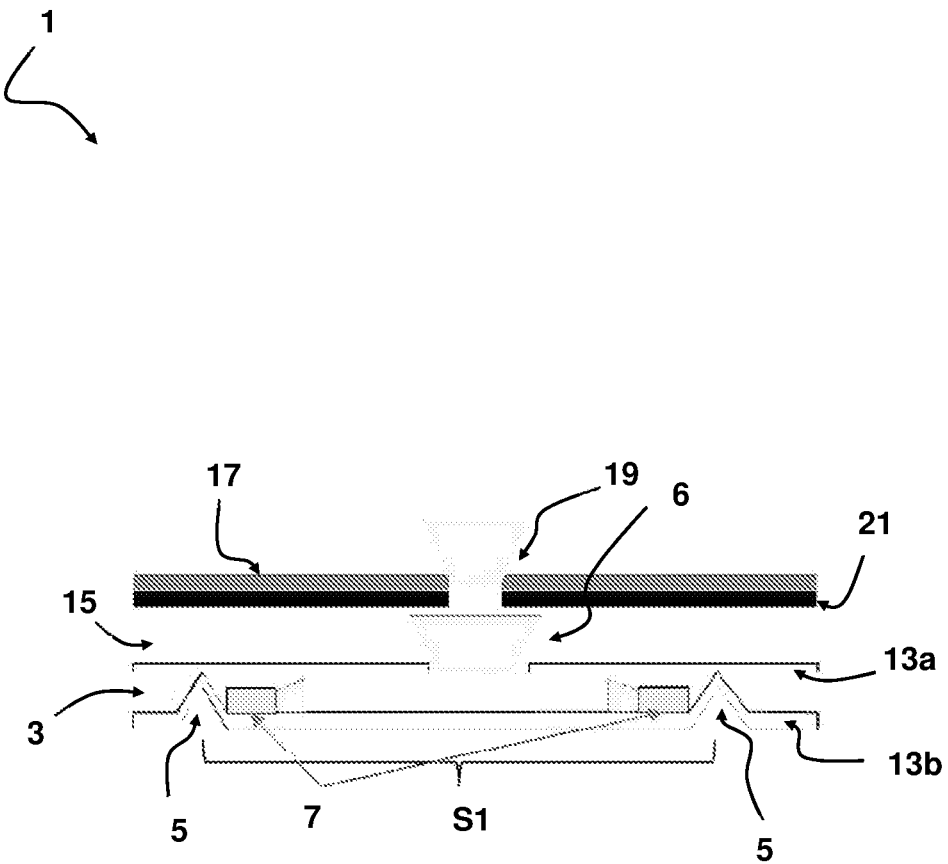
FIG. 8 shows a cross sectional side view of a schematic diagram of a segmented light guide.

FIG. 8 shows a cross sectional side view of a schematic diagram of a segmented light guide 1. The segmented light guide 1 includes a thermoplastic light channeling layer 3 with grooves 5 thermoformed therein. The grooves 5 divides at least a first segment S1 of the thermoplastic light channeling layer 3 from other neighboring segments of the thermoplastic light channeling layer 3. Two light sources 7 are provided at the first segment S1. The grooves are shaped such as to block light going from the first segment S1 to the neighboring other segments through said groove, and/or vice versa.

The thermoplastic light channeling layer 3 is attached to a further light channeling layer 15 having different material properties than the thermoplastic light channeling layer 3.

In an example, the further light channeling layer 15 is configured to remain thermally unmoldable at a pliable forming temperature at which the thermoplastic light channeling layer 3 is thermoformed. The thermoplastic light channeling layer 3 can be made out of thermoplastic polyurethane (TPU). However, other thermoplastic materials can also be used. Alternatively, the further light channeling layer 15 is thermoformed such as to provide a desired shape. The entire structure of the light guide, i.e. including at least the thermoplastic light channeling layer and the further light channeling layer, can be thermoformed under an elevated temperature and pressure in a desired three-dimensional shape defined by the employed mold. Both the thermoplastic light channeling layer and the further light channeling layer may be thermoformable under said elevated temperature and/or pressure during thermoforming. The further light channeling layer may be the layer with the highest glass transition temperature (Tg).

A preformed mold can be utilized having a shape such as to enable thermoforming the one or more grooves in the thermoplastic light channeling layer, and providing an overall shape to the further light channeling layer. In an example, a single mold is used for this. Advantageously, the preformed mold may be configured to support the integrity of the light guide during molding (thermoforming). However, it may also be possible that different molds are used for thermoforming the thermoplastic light channeling layer and the further light channeling layer, respectively.

Light reflecting layers 13a, 13b are applied on at least a portion of an upper side and/or a lower side of the thermoplastic light channeling layer 3. A first light reflecting layer 13a is arranged between the thermoplastic light channeling layer 3 and the further light channeling layer 15. An opening 6 is arranged in the first light reflecting layer 13a located at least at the first segment S1. The opening 6 is configured such as to allow light generated by the light sources 7 in the first segment S1 of the thermoplastic light channeling layer 3 to enter the further light channeling layer 15.

A second light reflecting layer 13b is arranged at least at a portion of the groove. In this example, the second light reflecting layer 13b also covers the segments S1. The light reflecting layers 13a, 13b may be made out of a stretchable and/or thermoformable ink layer. In this way, these layers can be stretched out during thermoforming, reducing the risk of damage or light leakage as a result of the deformation. All layers may be thermoformable, thus being stretchable at a processing temperature.

The stretchable and/or thermoformable ink layers 13a, 13b can be applied on the thermoplastic light channeling layer 3 prior to thermoforming the at least one groove 5, the stretchable and/or thermoformable ink layers 13a, 13b may follow the shape of the groove 5.

The light sources 7 can be arranged on a substrate layer which is attached to the thermoplastic light channeling layer 3. In this example, the further light channeling layer 15 includes a graphical layer 17 attached thereto. The graphical layer 17 has an icon 19. Light generated in the first segment S1 by light sources 7 can be directed towards the icon 19 through the opening 6 in the first reflecting layer 13a. The segmented light guide 1 may for instance be used in an electronic device such as an indicator panel. Many applications are also possible.

The segmented light guide 1 can reduce crosstalk and hotspots when used for illuminating icons 19 in the graphical layer 17. Crosstalk is obtained when light of one segment influences light of another (neighboring) segment, for instance as a result of light leaking from one segment to the other. A hotspot is a region of higher brightness as a result of the location of a light source (e.g. LED).

Light leaking from the thermoplastic light channeling layer 3 through the first reflective layer 13a to the further light channeling layer 15 may partially illuminate an neighboring icon 19 of the graphical layer 17. A light absorbing layer 21 may be arranged for capturing this light. This light absorbing layer 21 may be in a dark color, such as for example black. However, other colors (e.g. blue) may also be used. Different types of graphic layers 17 can be used (color, logos, icons, additional parts). Using such a absorbing layer 21 (e.g. dark layer) can improve homogeneity, as well as improve contrast. It will be appreciated that not all icons may require such a light absorbing layer 21. However, it can be beneficial since an edge of the reflecting layer between the thermoplastic light channeling layer 3 and the further light channeling layer 15 may be prone to scattering such that the homogeneity is reduced significantly.

Figure 9:
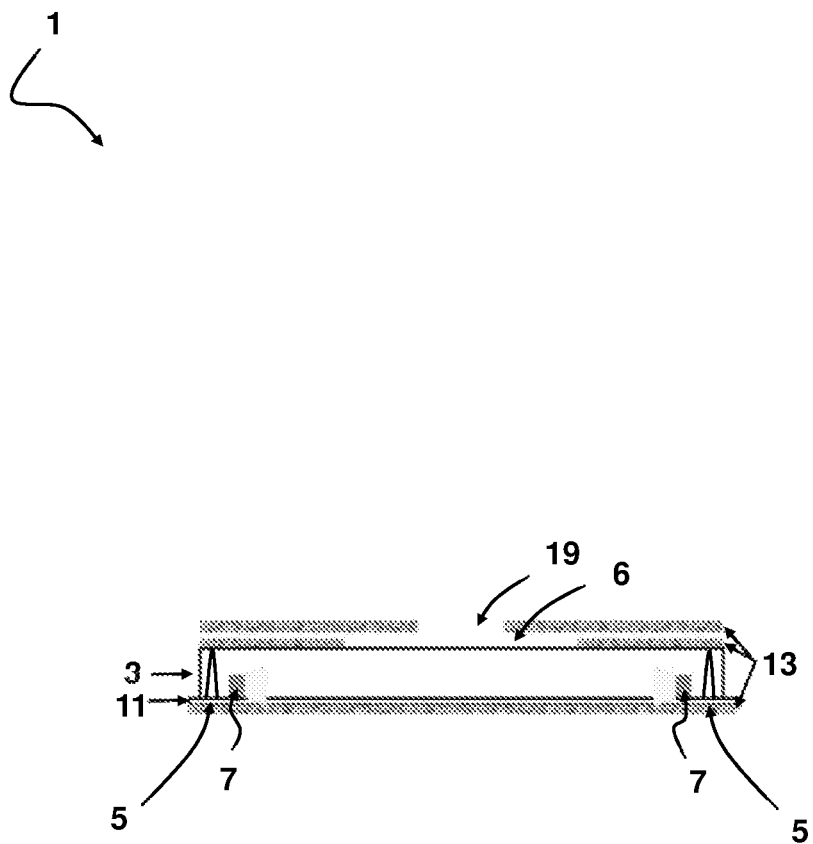
FIG. 9 shows a cross sectional side view of a schematic diagram of a segmented light guide.

FIG. 9 shows a cross sectional side view of a schematic diagram of a segmented light guide 1 including a thermoplastic light channeling layer 3 and a substrate layer 11 with light sources 7 arranged thereon. The substrate layer 11 is imprinted in the thermoplastic light channeling layer by means of thermoforming. Furthermore, light reflecting layers 13 are provided for delimiting the first segment S1. The first segment S1 borders neighboring segments along the grooves.

The substrate layer 11 may include a necessary electronic circuit and/or electronic components for the one or more light sources (e.g. LEDs). In an example, the substrate layer 11 is made out of PET. However, other suitable materials may also be used. The one or more light sources 7 can be arranged at a bottom side of the thermoplastic light channeling layer 3 (in this example) and/or a top side of the thermoplastic light channeling layer 3 (not shown).

Figure 10:
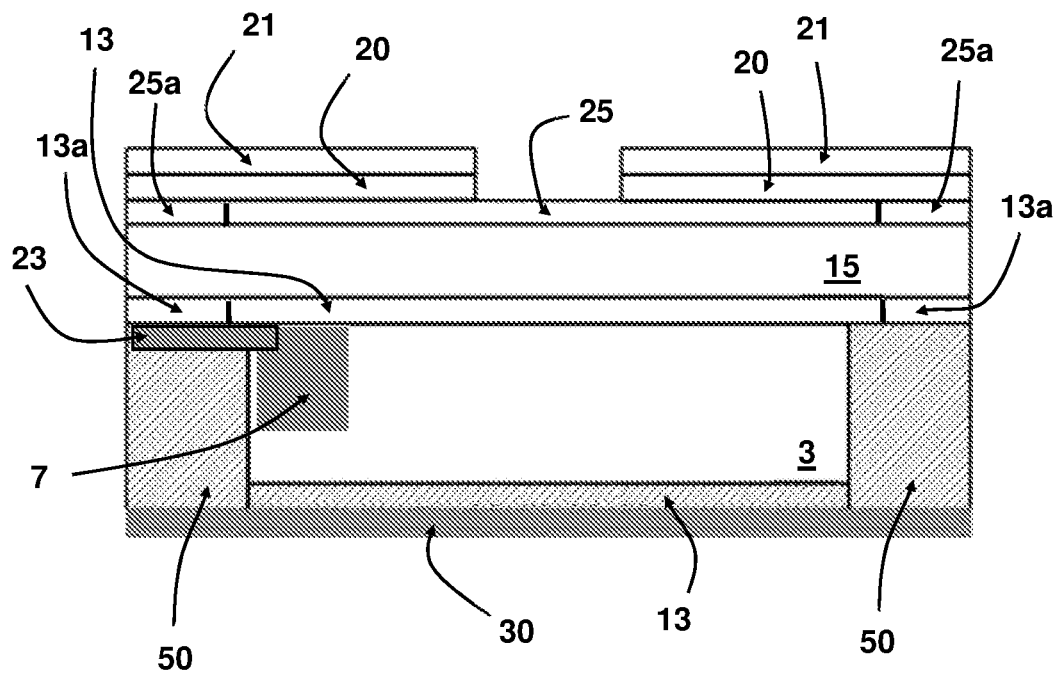
FIG. 10 shows a cross sectional side view of a schematic diagram of a segmented light guide.

FIG. 10 shows a cross sectional side view of a schematic diagram of a segmented light guide 1. An electronic circuit 23, a light reflecting layer 13, one or more light sources (e.g. LEDS) and other components (not shown) may be installed on a substrate (e.g. PET, TPU, etc.). A thermoplastic light channeling layer 3 (e.g. TPU) can be laminated over at least the one or more light sources under elevated temperature. By applying a uniform pressure distribution over the entire surface (e.g. 1 bar, 90-100 degrees Celsius for Crystalflex), a substantially flat surface can be obtained. The further light guide layer 15 (e.g. PC) may also be applied, for example in the same step. The entire light guide may be formed under higher pressure and/or temperature (e.g. 60-80 bar, 155-160 degrees Celsius for polycarbonate). At these conditions, the thermoplastic light channeling layer 3 (e.g. TPU) may become too fluid. Advantageously, the thermoplastic light channeling layer 3 can be fixated with or held by a mold. The substrate and the inks can be stretchable and/or thermoformable (e.g. pliable under elevated temperature and pressure).

Additionally or alternatively, ink layers may be applied on both sides of the further light channeling layer 15. The electronic circuit and other components can be arranged or embedded on the inside of the further light channeling layer 15. The thermoplastic light channeling layer 3 may be applied on the further light channeling layer 15 by means of lamination. One or more light reflecting layers 13 may applied (e.g. printed). The thermoplastic light channeling layer 3 may be more mobile than the further light guide layer 15 during thermoforming in order to form the one or more grooves acting as light blocking walls without leaving any trace on layer 15.

Additionally or alternatively, the thermoplastic light channeling layer is formed by injection molding. Also the light reflecting layers may be formed by means of injection molding. Furthermore, the light blocking grooves segmenting the injection molded thermoplastic light channeling layer may also be injected molded by employing a reflective material (e.g. white material). For instance, the injected molded thermoplastic light channeling layer may be applied after thermoforming the further light channeling layer 15. The further light channeling layer may also be injection molded.

A light absorbing layer 21 may be arranged surrounding an opening through which light is allowed the light guide. This light absorbing layer 21 may be in a dark color. For example, a black ink layer may be used. Optionally, a diffusor 25 (e.g. a white ink diffusor) is applied at the opening through which light is allowed to escape the light guide. The diffusor may be formed by a thin light ink layer (e.g. white).

The light reflecting layer 13 may be provided by a light reflecting coating with a gradient pattern; thus covering the thermoplastic light channeling layer 3 on a top side with a gradient pattern. The sides of the light reflecting layer 13 may be terminated by a light blocking coating 13a (e.g. dark or black) configured to substantially block light guiding in the cover foil. The further light channeling layer 15 is further provided with a top coating 20, 21 that is a stack of white and black ink-black on the outside. The coating 20, 21 leaves the icon picture free so that the further light channeling layer shows the icon when illuminated. The diffusor 25 may be terminated by a light blocking coating 25a (e.g. dark or black) configured to substantially block light.

An additional bottom layer 30 may be provided. The additional bottom layer may be a single or combination of functional and non-functional foils, being flat or containing contacts for via's or slots for backside contacting that are protected during the moulding process. It can also be imagined that functionalities, in the form of chips, sensors or devices, may be added to this part, by which the front part may be contacted or powered. Also emitting LEDs can be added to layer 30.

Figure 11:
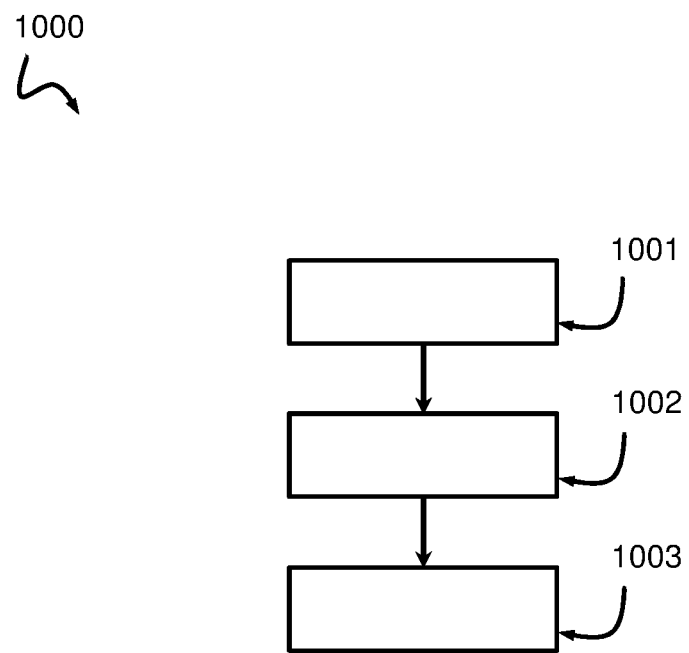
FIG. 11 shows a schematic diagram of a method for manufacturing a segmented light guide.

FIG. 11 shows a schematic diagram of a method for manufacturing a segmented light guide. In a first step 1001, a thermoplastic light channeling layer 3 is provided. In a second step 1002, at least one groove 5 is thermoformed in the thermoplastic light channeling layer 3, the at least one groove 5 dividing at least a first segment S1 of the thermoplastic light channeling layer 3 from at least a second segment S1 of the thermoplastic light channeling layer 3. In a third step 1003, one or more light sources 7 are provided at at least the first segment S1. Furthermore, the at least one groove 5 is shaped such as to block light going from the first segment S1 to the second segment S1 through said groove 5, and/or vice versa.

Advantageously, both the overall shape of the thermoplastic light channeling layer 3 (e.g. non-planar 3D shape) as the at least one groove 5 (for segmentation) can be provided during the thermoforming step. For instance, a dashboard-like construction for a vehicle may require a curved 3D shape. Along the at least one groove 5 an indentation can be formed so as to define the plurality of segments of the thermoplastic light channeling layer 3. The at least one groove 5 can be configured to prevent light from leaking to adjacent areas (i.e. blocking light). The segments may be delimited accurately using the thermoforming step. Optionally, the one or more light sources 7 (e.g. LEDS) are embedded in the thermoplastic light channeling layer 3. This can be performed during a thermoforming step. The one or more light sources 7 may be arranged on the substrate layer 11.

The light generated within at least the first segment S1 can be directed towards at least one opening 6 through which an icon or a graphical layer 17 can be illuminated.

In an example, the segmented light guide 1 may include at least two light channeling layers, namely a thermoplastic light channeling layer 3 and a further light channeling layer 15. The thermoplastic light channeling layer 3 may be segmented using thermoforming. Indentations or grooves 5 may be imprinted on the thermoplastic light channeling layer 3 for this purpose. As a result, the thermoplastic light channeling layer 3 may remain substantially unitary when being segmented. It is not required to cut pieces out from the thermoplastic light channeling layer (i.e. remove parts of the light guide) and provide light insulation for obtaining segmentation.

The further light channeling layer 15 may have different material properties than the thermoplastic light channeling layer 3. The thermoplastic light channeling layer 3 may be made of TPU or a similar rubber-like material which can be sufficiently softened and applied over the one or more light sources (e.g. LEDS arranged on the substrate layer). The structural stability of the segmented light guide 1 can be enhanced using the further light channeling layer 15. The further light channeling layer 15 may enable the thermoformed thermoplastic light channeling layer 3 to keep its form (overall shape and the at least one groove). The further light channeling layer is more rigid and can also be deformed under high pressure and high temperature for obtaining a (permanent) 3D form.

In an optional reflective layer 13 between the thermoplastic light channeling layer 3 and the further light channeling layer 15, there can be at least opening 6 through which generated light can escape the light channeling compartment formed at the first segment S1, towards the icon of the graphical layer 17. Optionally, the at least one opening 6 is larger than the opening formed by the icon 19 in the above graphical layer 17. That is because the opening in reflective layer between the two light channeling layers may also result in scattering at its edges where opening was made, which can reduce homogeneity.

It will be appreciated that the various drawings are not drawn to scale from one figure to another nor inside a given figure.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A segmented light guide, comprising:
a thermoplastic light channeling layer comprising at least one thermoformed groove separating at least a first segment of the thermoplastic light channeling layer from at least a second segment of the thermoplastic light channeling layer;
one or more light sources at least at the first segment;
wherein the at least one groove is shaped to block light from passing between the first segment and the second segment through said groove,
wherein the thermoplastic light channeling layer is attached to a further light channeling layer with different material properties than the thermoplastic light channeling layer,
wherein the thermoplastic light channeling layer has a first glass transition temperature,
wherein the further light channeling layer has a second glass transition temperature, and
wherein the first glass transition temperature is lower than the second glass transition temperature.

2. An electronic device comprising a segmented light guide according to claim 1.

3. An indicator panel comprising a segmented light guide according to claim 1.

4. The segmented light guide according to claim 1, wherein the thermoplastic light channeling layer is made of a material softer than the further light channeling layer.

5. The segmented light guide according to claim 1, wherein the one or more light sources are arranged on a substrate layer that is attached to the thermoplastic light channeling layer.

6. The segmented light guide according to claim 1, wherein the further light channeling layer includes a graphical layer comprising a graphical print.

7. The segmented light guide according to claim 1, further comprising at least one light reflecting layer on at least a portion of an upper side and/or a lower side of the thermoplastic light channeling layer,
wherein the at least one light reflecting layer includes a first light reflecting layer arranged between the thermoplastic light channeling layer and the further light channeling layer,
wherein at least one opening is arranged in the first light reflecting layer located at least at the first segment, and
wherein the at least one opening is configured to allow light generated by the one or more light sources in the first segment of the thermoplastic light channeling layer to enter the further light channeling layer.

8. The segmented light guide according to claim 7, wherein the at least one light reflecting layer includes a second light reflecting layer arranged at least at a portion of the groove.

9. The segmented light guide according to claim 7, wherein at least one applied light reflecting layer is made of an ink layer, and
wherein the ink layer is a stretchable ink layer and/or a thermoformable ink layer.

10. A method for obtaining a segmented light guide, the method comprising:
providing a thermoplastic light channeling layer;
thermoforming at least one groove in the thermoplastic light channeling layer, the at least one groove dividing at least a first segment of the thermoplastic light channeling layer from at least a second segment of the thermoplastic light channeling layer; and
providing one or more light sources at least at the first segment;
wherein the at least one groove is shaped to block light from passing between the first segment and the second segment through said groove,
wherein the thermoplastic light channeling layer is attached to a further light channeling layer with different material properties than the thermoplastic light channeling layer,
wherein the thermoplastic light channeling layer has a first glass transition temperature,
wherein the further light channeling layer has a second glass transition temperature, and
wherein the first glass transition temperature is lower than the second glass transition temperature.

11. The method according to claim 10, wherein the further light channeling layer is thermoformed to provide a desired shape.

12. The method according to claim 10, wherein the further light channeling layer is configured to remain thermally unmoldable at a pliable forming temperature at which the thermoplastic light channeling layer is thermoformed.

13. The method according to claim 10, wherein the thermoplastic light channeling layer is made of a material softer than the further light channeling layer.

14. The method according to claim 10, wherein the one or more light sources are arranged on a substrate layer that is attached to the thermoplastic light channeling layer.

15. The method according to claim 10, wherein the further light channeling layer includes a graphical layer comprising a graphical print.

16. The method according to claim 10, further comprising applying a light reflecting layer on at least a portion of an upper side and/or a lower side of the thermoplastic light channeling layer,
wherein the applying includes applying a first light reflecting layer arranged between the thermoplastic light channeling layer and the further light channeling layer,
wherein at least one opening is arranged in the first light reflecting layer located at least at the first segment,
wherein the at least one opening is configured to allow light generated by the one or more light sources in the first segment of the thermoplastic light channeling layer to enter the further light channeling layer.

17. The method according to claim 16, wherein the applying includes applying a second light reflecting layer arranged at least at a portion of the groove.

18. The method according to claim 16, wherein at least one applied light reflecting layer is made of an ink layer, and
wherein the ink layer is a stretchable ink layer and/or a thermoformable ink layer.

19. The method according to claim 18, wherein the ink layer is applied on the thermoplastic light channeling layer prior to thermoforming the at least one groove, and
wherein the stretchable and/or thermoformable ink layer following the shape of the groove.

* * * * *